Nov. 3, 1959    R. RICE    2,911,147
SELF-REPRODUCING TAPE CONTROL SYSTEM
Filed Oct. 25, 1957    8 Sheets-Sheet 1

INVENTOR
REX RICE
BY *P.E. Henninger*
ATTORNEY

Nov. 3, 1959   R. RICE   2,911,147
SELF-REPRODUCING TAPE CONTROL SYSTEM
Filed Oct. 25, 1957   8 Sheets-Sheet 2
FIG. 2
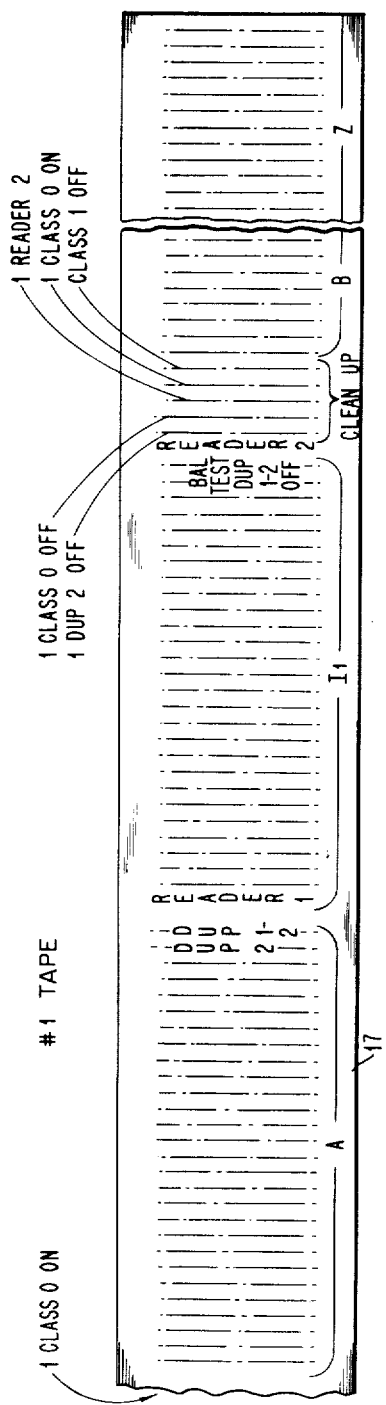
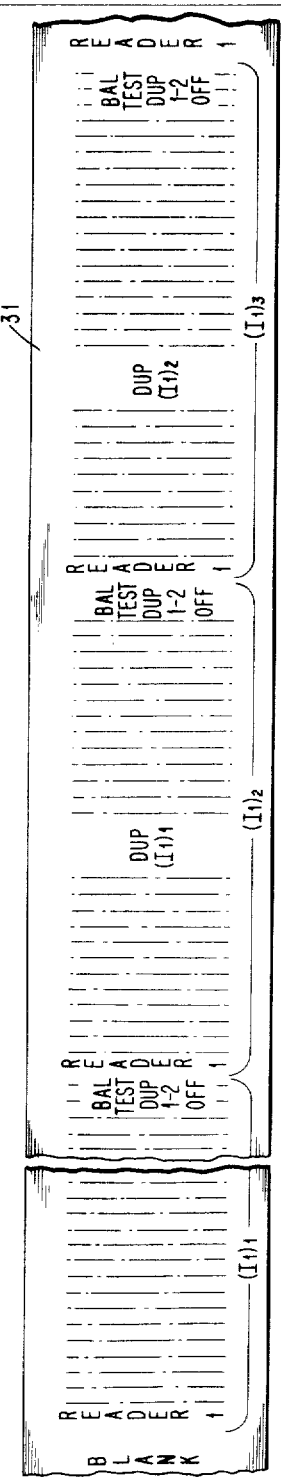

Nov. 3, 1959

R. RICE 2,911,147

SELF-REPRODUCING TAPE CONTROL SYSTEM

Filed Oct. 25, 1957

R. RICE 2,911,147

SELF-REPRODUCING TAPE CONTROL SYSTEM

Filed Oct. 25, 1957

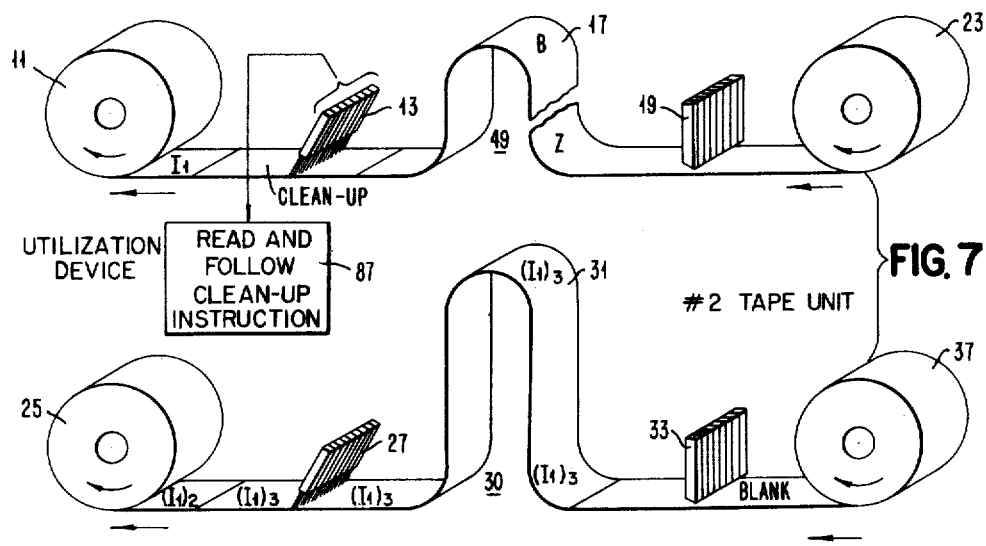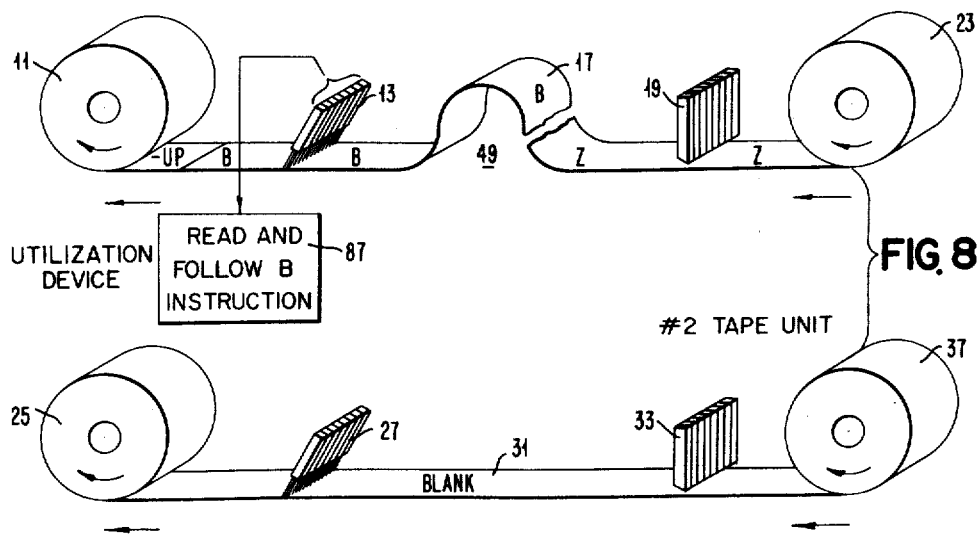

2,911,147
SELF-REPRODUCING TAPE CONTROL SYSTEM

Rex Rice, Poughkeepsie, N.Y., assignor to International Business Machines Corporation, New York, N.Y., a corporation of New York Application October 25, 1957, Serial No. 692,497

15 Claims. (Cl. 235—61.6)

This invention relates to a system for programming the operation of computers or the like. The invention relates particularly to such systems adapted to utilize iterative routines.

In its more particular aspects, the invention relates to a program tape system for the control of computers, data processing systems or other systems and devices adapted for programmed operations.

Many control processes include repetitive or iterative steps. In computers, for example, it may be desired to evaluate a simple polynomial $2x+5$ for all values of $x$ in the range between $-2$ and $+2$ at intervals of 0.1. This calculation can be performed under automatic program control by starting with the value $x$ equal to $-2$.

It is common programming practice to instruct a computer to perform the indicated multiplication and addition for the first value of $x$, add 0.1 to the value of $x$, multiply and add, add 0.1 to the previous value of $x$, multiply and add, etc. An iterative program of this type can be carried on, for example, until the value of $x$ is not greater than 2.

A similar example arises in evaluating the exponential $e^x$ for a value of $x$ between 0 and 1 to a result accurate to four decimal places. In such evaluation, use would be made of the series $$e^x = 1 + x + \frac{x^2}{2!} + \frac{x^3}{3!} + \cdots$$

The indicated process involves an iteration until the term $$\frac{x^n}{n}$$

is less than .00005, for example.

The operation of computers and similar systems has been controlled heretofore by punched paper tape. The Harvard University Mark I Computer, for example (see C. D. Lake et al. United States Patent 2,616,626), was provided with a master control tape and several auxiliary subordinate or secondary tapes of the endless loop type which could be used to control the computer during a series of iterative processes. The IBM Selective Sequence Controlled Computer, for example (see F. E. Hamilton et al. United States Patent 2,636,672), was equipped with an auxiliary tape punch used to record intermediate results which could also be used to reintroduce data into the computer.

It is known also that master program tapes have been used for the control of computers in conjunction with subroutine tapes deriving their instructions from a master program tape. None of these known programming systems, however, had the ability to automatically regenerate subroutine instructions for the control of programmed systems; that is to say, these previous program control systems either used a subroutine from a second control tape only once for each used instruction or required instructions as to the number of times a particular subroutine was to be employed.

It is, therefore, an important object of this invention to provide means for automatically regenerating subroutine instructions and data for the control of programmed systems.

It is a further important object of this invention to provide means for automatically regenerating or reproducing subroutine program instructions and utilizing and regenerating such subroutine instructions under control of the programmed system such that regeneration and utilization of subroutine instructions automatically follows in repetitive order until an iterative process has been completed.

A more specific object of this invention consists in providing means for automatically reproducing a set of subroutine instructions in a control tape and reproducing and utilizing such reproduced subroutine instructions an indefinite number of times until the condition of an iterative process no longer requires the subroutine.

It is a further object of this invention to automatically reproduce a set of subroutine instructions in a subordinate or secondary control tape and continue reproducing and utilizing the subroutine in the subordinate control tape until the condition of the iterative process being controlled itself effectively halts such reproduction and utilization.

In programming techniques, a programmer may set up a set of instructions in a punched paper tape constituting a program. Included in this program may be one or more subordinate programs, punched once each. For example, instructions constituting a program $AI_1$, $BI_2$ and $CI_3$ in which subordinate or iterative programs are represented by $I_1$, $I_2$ and $I_3$, can, according to the invention, be punched into a paper tape. When the nature of a problem demands use of a subroutine a number of times, control may be switched from the program tape, into which the program was punched in the first instance, to an iterate or sub-program tape such that the iterate subroutine is reproduced in the iterative tape and read therefrom as often as may be necessary to complete the repetitive process. The invention, therefore, contemplates the use of a pair of tape punches each associated with a tape reader constituting a first and a second tape unit. When a control signal is sensed in the first tape unit, the indicated subroutine will be punched into a tape at the second tape unit and will continue to be punched into and read from the second tape until a condition test inherent in the process being performed indicates that repetition of the particular subroutine is no longer necessary. Then control of the computer will be switched back to the first tape unit where the $BI_2$ part of the program will be read and acted upon. The second tape unit will simultaneously copy the $I_2$ subroutine and according to a control signal will continue to punch and read as necessary to the problem solution as previously stated.

In the example given for the evaluation of a polynomial, the iteration is completed when the difference $x-2$ is positive. In the example given for evaluating the exponential, the iteration is completed when the result has reached a predetermined standard of accuracy. Both of these conditions can be indicated from comparing devices which are common to the computing and data processing art. The comparison of interim results herein to determine whether the sign of a sum is either positive or negative, or whether it conforms to a standard of accuracy, is referred to as a balance test. Such balance tests and resulting response signals are a function of the IBM Type 610 Auto-Point Computer disclosed in a publication by International Business Machines Corporation, entitled, Manual of Operation, IBM 610 Auto-Point Computer, copyright 1957.

Thus, in the instance of evaluation of a polynomial, a computer or data processing machine can be instructed to test the value of $x$ at each stage of the operation to determine whether or not it is greater than 2 and if the test is positive, the iteration can be terminated. In the case of the evaluation of an exponential, the evaluation of the terms can be terminated after the desired accuracy has been reached by instructing the machine to compare the successive results with a selected standard of accuracy, such that after calculating each term, $$\frac{x^n}{n}$$

a test is performed to see whether it is greater or less than the selected standard of accuracy.

The specific nature of the invention will become apparent from a perusal of the following detailed description when read in light of the drawings, wherein like reference numerals indicate like parts, and wherein:

Fig. 2 represents a pair of tape sections in which No. 1 tape is a program tape and No. 2 tape is a subordinate or iterative subroutine tape;

Fig. 7 is a diagrammatic illustration of the fifth step of the same typical operation;

Fig. 8 is a diagrammatic illustration of the sixth step of the operation in which the program control has been returned to the program tape following an iterative process;

Figure 9A:
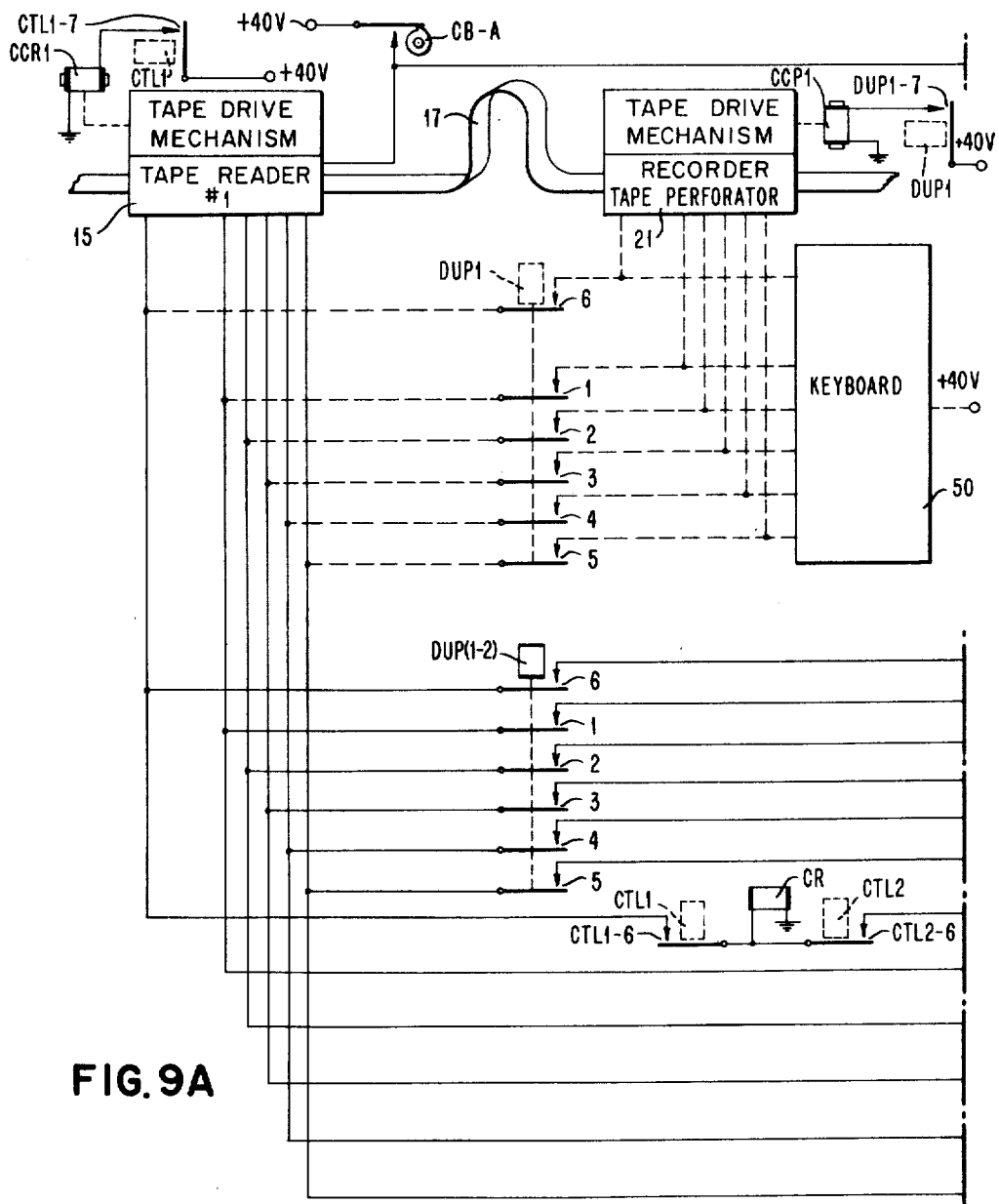
Figure 10:
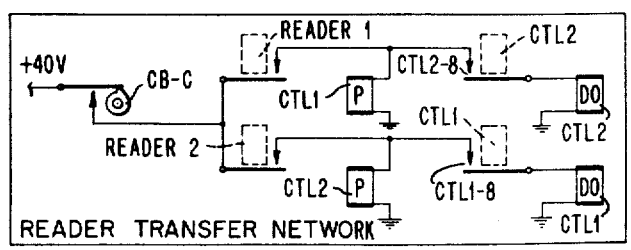
Figure 9B:
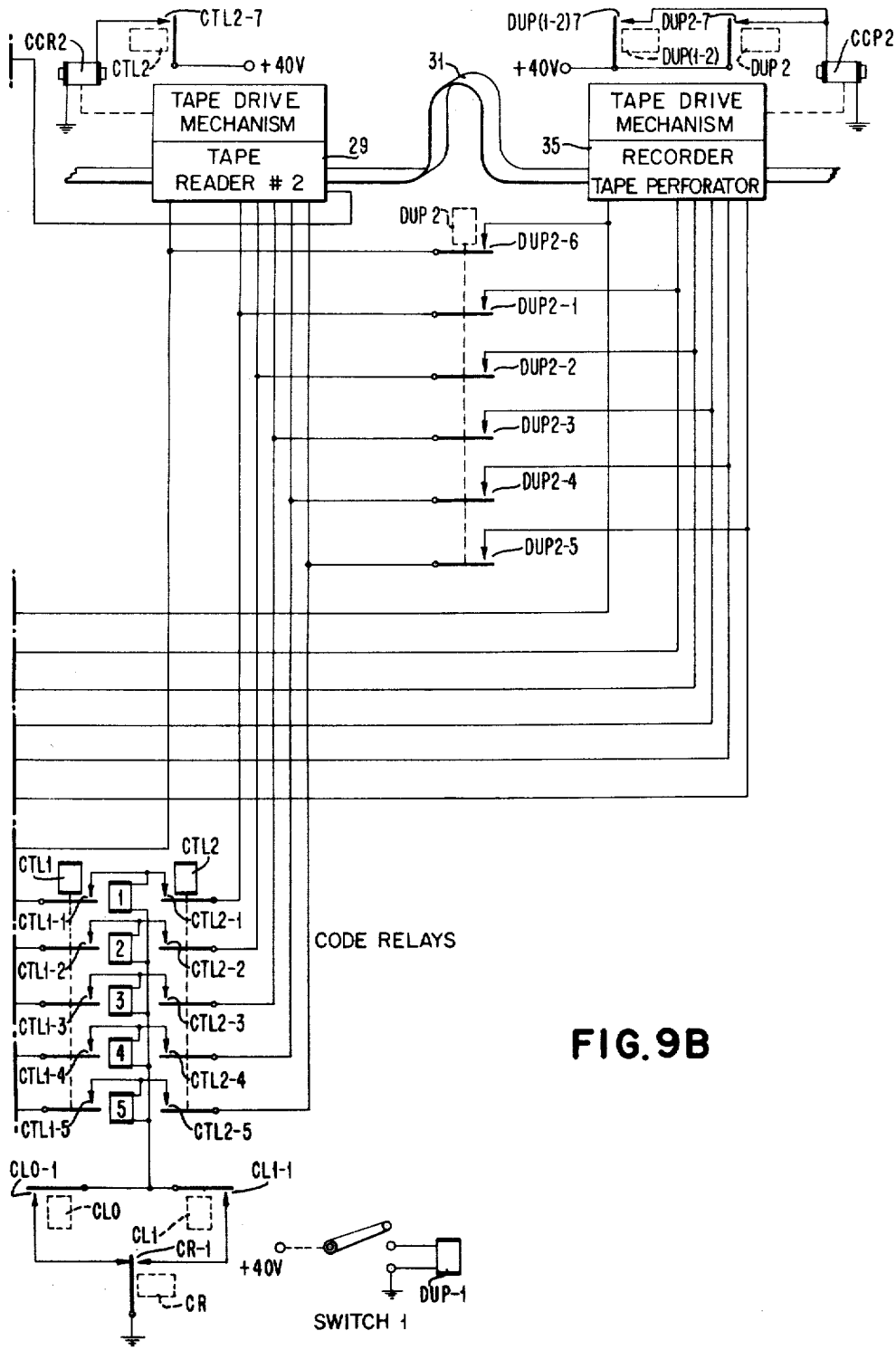

Figs. 9A and 9B together comprise a diagrammatic representation of a pair of tape readers and perforators and control circuits used in connection therewith;

Fig. 10 is a reader transfer network; and

Figure 11:
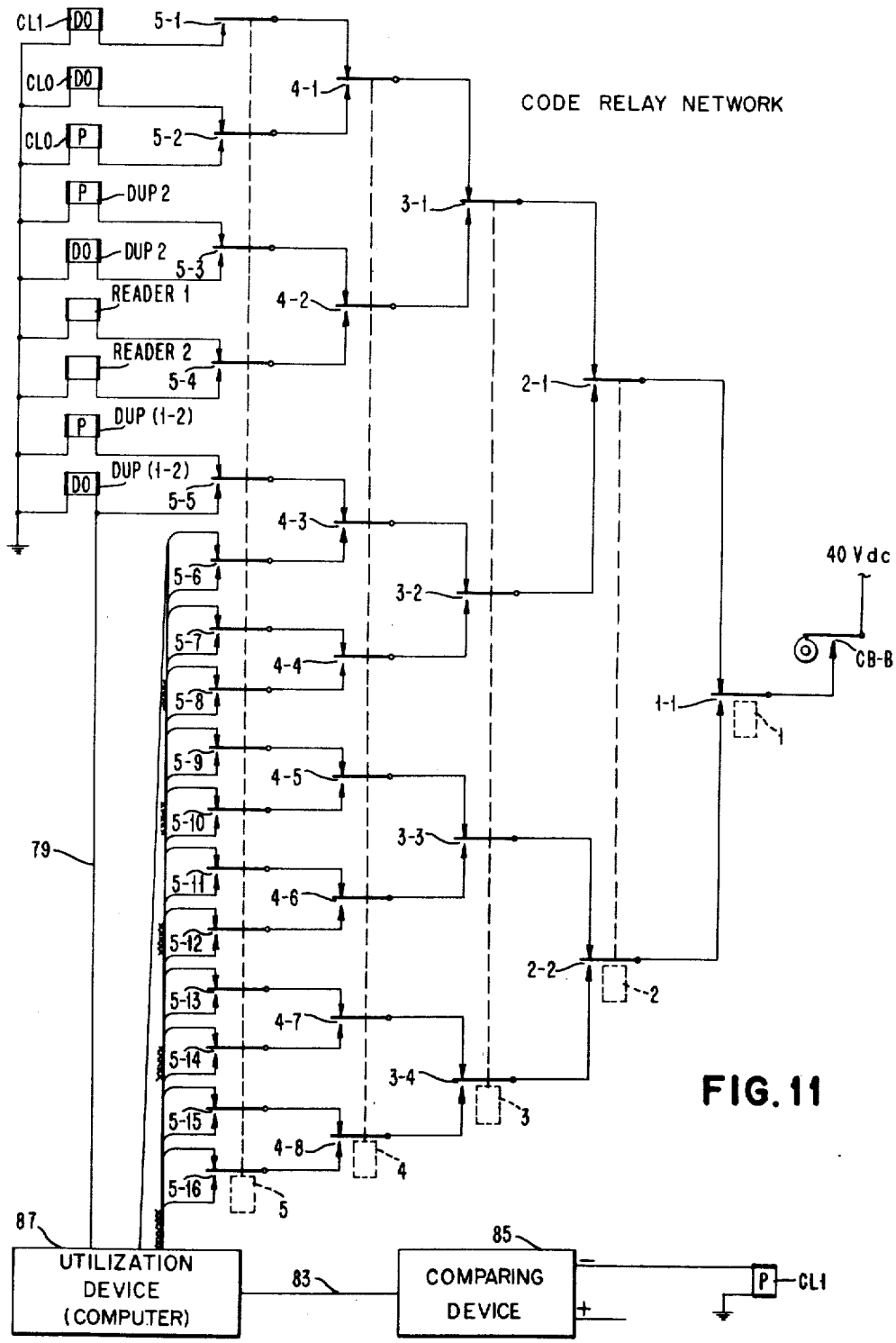

Fig. 11 is a code relay network and associated units.

Figure 1:
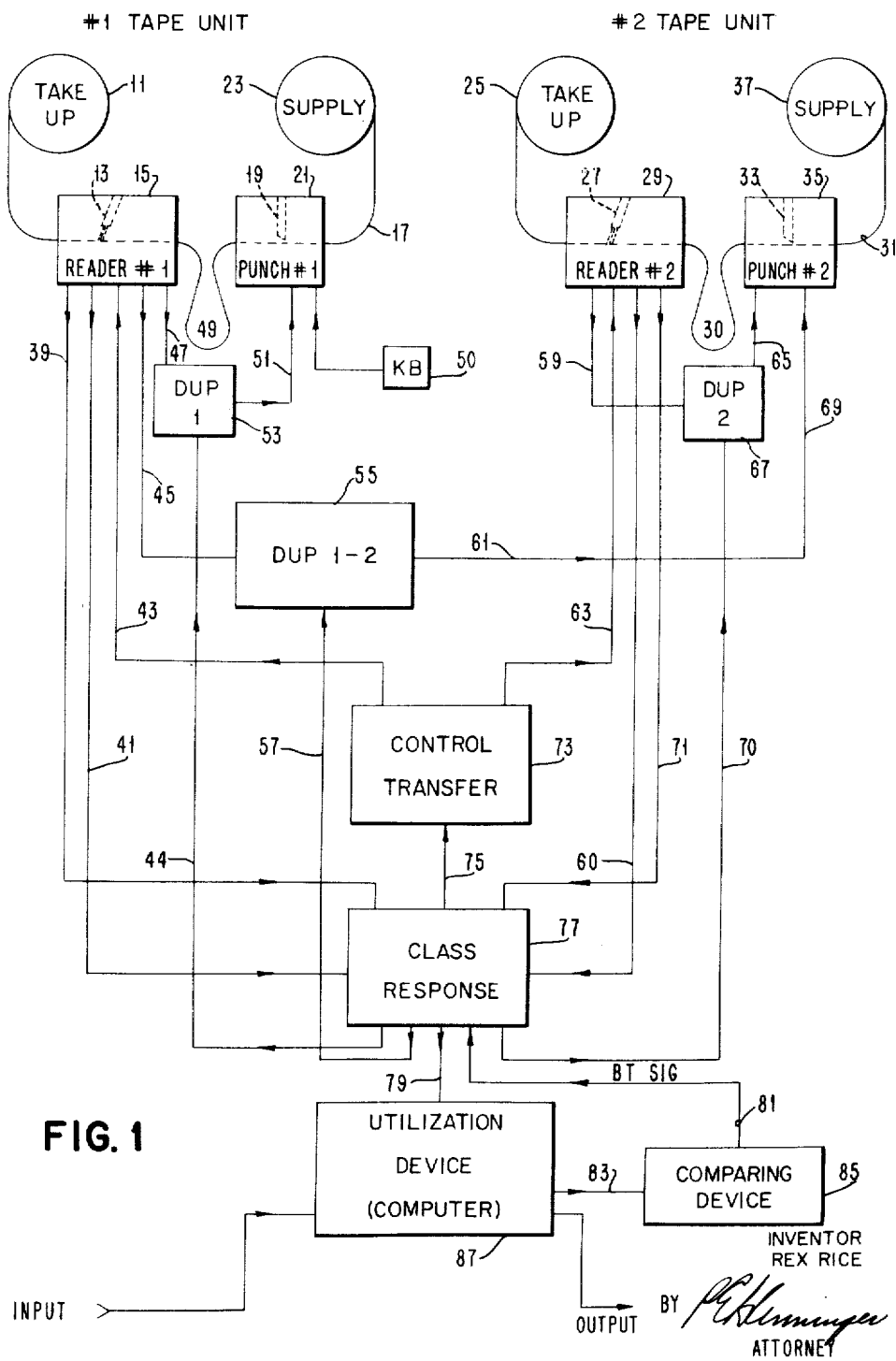
Fig. 1 is a schematic diagram in the nature of a flow chart indicating the essential components of the system and illustrating the operation of the system comprising the invention herein.

Reference to Fig. 1 will show that the iterative tape programming system includes two tape handling devices consisting of tape readers 15 and 29 and tape perforators 21 and 35. These units are modifications of the well known IBM Type 046 Tape Reading Unit and the IBM Type 962 Tape Punch Unit, respectively. The tape reading unit is essentially like the tape reader disclosed in United States Patent 2,619,532, issued to E. O. Blodgett, while the tape punch is essentially like the tape punch disclosed in United States Patent 2,859,817, issued to H. L. Tholstrup.

In the description to follow, a tape reader and its associated tape punch will be referred to as a tape unit. Thus, the tape reader 15 and its associated punch 21 may be designated as a first tape unit while the tape reader 29 and its associated tape punch 35 may be designated as the second tape unit.

In the tape units illustrated in Fig. 1, the tape moves from right to left, i.e., from a supply reel to a take-up reel in each unit. In the first tape unit which is adapted to receive a master program tape, a master program tape 17 moves from a supply reel 23 and is fed into a punching location 19 of the first tape punch 21. As the master program tape issues from the first tape punch 21, the tape forms a loop 49 before it enters a reading location 13 of the first tape reader 15 of the first tape unit. Thereafter the master program tape issuing from the first tape reader 15 is coiled upon a take-up reel 11. Similarly, a subroutine tape 31 in the second tape unit leaves a supply reel 37 and is fed into a punching location 33 of the second tape punch 35. Leaving the second tape punch 35, the subroutine tape 31 forms a loop 30 before entering a reading location 27 of the second tape reader 29 of the second tape unit; then the tubroutine tape 31 passes to a take-up reel 25 upon which it is coiled.

Fig. 2 illustrates, merely by way of example, an eight channel tape in which holes punched in channels 1 through 5 represent coded word instructions adapted to control machine operation. Punching of a hole or failure to punch a hole in the six channel of the tape controls class selection which for purpose of this description may be characterized as class 0 when no hole is punched in the six channel of the tape, and as class 1 when a hole is punched in the six channel of the tape. The class selection indications are usefully employed herein for recognizing and utilizing alternative instructions.

In the programming of calculators, such as the aforementioned computer, and data processing systems, it is a convenience to introduce an instruction in the alternative. In many problems, for example, it may be necessary to choose one of several possible methods of solution after some point in the calculation, depending upon conditions generated up to that point. For example, in the calculation of the roots of a quadratic equation, it is possible that a discriminant ($b^2-4ac$) may be negative. If the discriminant is negative, the roots of the quadratic equation will be complex numbers, and it will be necessary to separate the real and imaginary parts.

In solving for the roots of a series of such equations, it is usually inconvenient to separate by visual inspection the equations having real roots from the equations having imaginary roots, and then solve them with separate programs. By resort to class response or class selection, it is possible to set up a program that will solve for every condition, dependent upon the sign of the discriminant. These and other functions of the system, including purely functional operations, can be controlled by designating program instructions as belonging either to one class or to another class, such as class 0 and class 1, for example. The control circuits can be so conditioned that they will respond to class 0 operations but not to class 1 operations or to class 1 operations but not to class 0 operations. The class of the operations is indicated herein by the presence or absence of a hole in the six channel of the tape, as stated. Thus, the system can be conditioned to ignore one instruction while reading and acting on an alternative instruction. During the duplication of subroutines from the program tape, all instructions are duplicated yet only those of the class to which the system is at the moment conditioned will be acted upon.

The operation to be described, in more detail, starts with a blank master program tape 17 (Fig. 1) in the first tape unit at the supply reel 23. The tape is threaded into the first tape punch 21 where it is punched with individual instructions coded by an operator using a keyboard 50, Fig. 1. A previously punched master program tape may be used with equal results. The tape loop 49 will then contain a complete set of instructions for the entire desired program. As mentioned previously, this program will contain one or more subroutines which will be used in an iterative process. A typical program is shown at the top of Fig. 2.

Six major process steps are schematically shown in Fig. 2 with reference to the master program tape 17 and the subroutine tape 31 which are being processed, respectively, in the first and second tape units.

Figure 3:
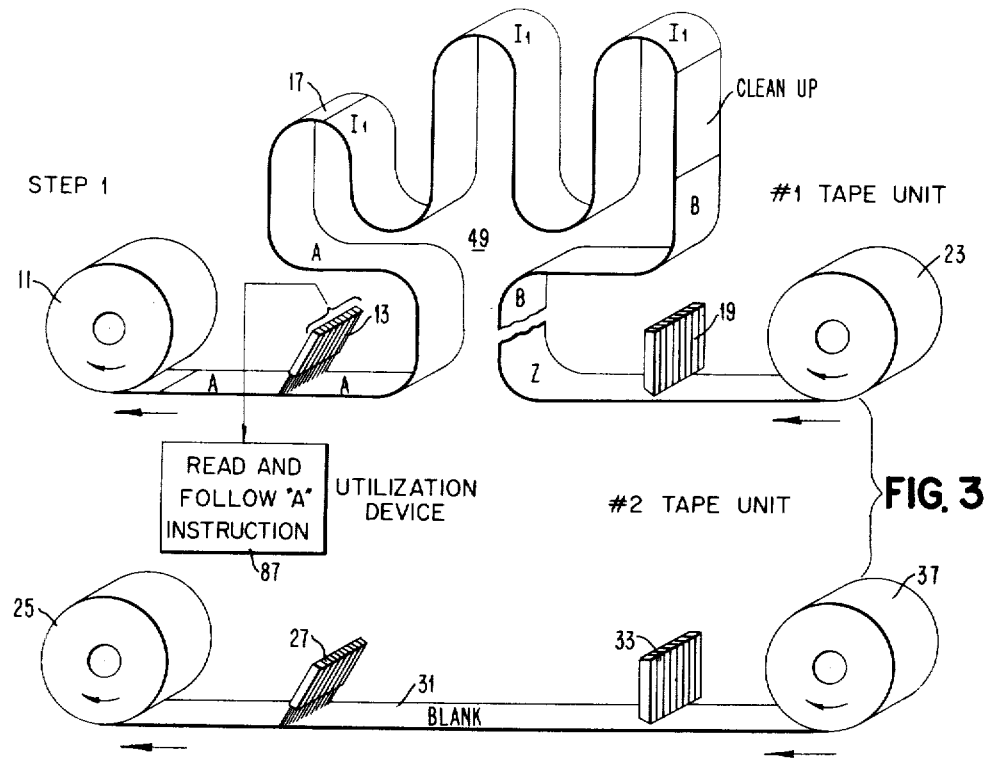
Fig. 3 is a diagrammatic illustration of the first step of a typical operation.

*Step 1 (Fig. 3).*—It is assumed for this example that conditions have been set up in the machine to read and obey instructions designated as class 0. Therefore, during step 1, the A section of the master program tape 17 is being read and the coded instruction words therein are being obeyed by a utilization device 87 (Fig. 1) which represents a computer or other program controlled system. As seen in the flow chart of Fig. 1, the A instruction codes which are read at the sensing location 13 of the first tape reader 15 pass to the utilization device 87 by way of a conductor 39, through a class response unit 77 and a conductor 79, As shown in the tape, schematic at the top of Fig. 2 (tape 17), the coded instruction word "DUP 1-2" is the last command read from the A section. In Fig. 1, this instruction is passed from the sensing location 13 of the first tape reader 15 via the wire 39, the class response unit 77, the wire 57, and to a DUP 1-2 unit 55. The DUP 1-2 unit 55 completes a path from the sensing location 13 of the first reader 15, via a wire 45, through the DUP 1-2 unit 55 and a line 61, to the punching location 33 of the second tape punch 35. This conditions the system for the duplication during step 2 of the $I_1$ code words which follow the A code words in the master program tape 17, as at the top of Fig. 2.

Figure 4:
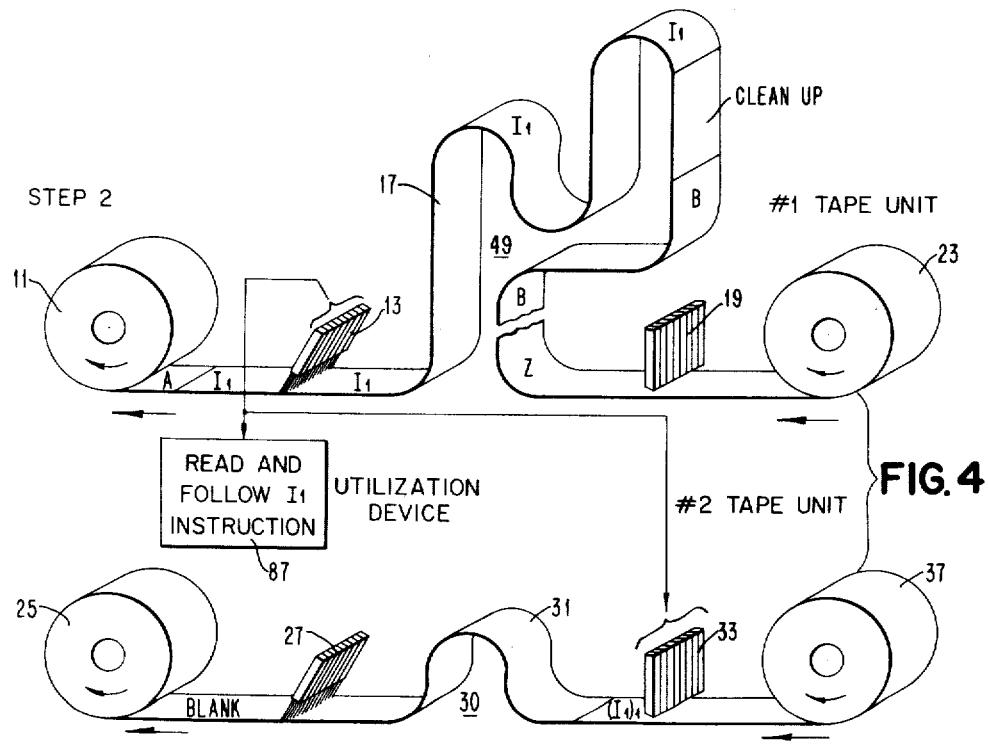
Fig. 4 is a diagrammatic illustration of the second step of the same typical operation.

*Step 2 (Fig. 4).*—During step 2 instruction codes from the $I_1$ section of the master program tape 17 (Fig. 2) are read by the first tape reader 15, and the coded instruction words therein are simultaneously sent along two paths as shown in Fig. 1: (1) From the first tape reader 15 to the second tape punch 35 by way of a circuit which includes the sensing location 13 of the first tape reader 15, the line 45, the DUP 1-2 unit 55, and the line 61 to the punching location 33 of the second tape punch 35. (2) From the first tape reader 15 to the computer or other utilization device 87 by way of a circuit which includes the sensing location 13 of the first tape reader 15, the line 39, the class response unit 77, and the line 79 to the utilization device 87.

The last instruction words in the subroutine $I_1$ is seen to be "BAL TEST" and "DUP 1-2 OFF." Reference to the flow diagram of Fig. 1 will show that this instruction follows the same parallel paths just traced in respect to the $I_1$ instruction codes, being sent to the computer 87 and being duplicated in the subroutine tape 31 by the second tape punch 35.

Since the class response 77 unit is conditioned for class 0 operation, the command "DUP 1-2 OFF" will be recognized and obeyed as follows: The coded words "DUP 1-2 OFF" will be read at the reading location 13 of the first tape reader 15 which transmits the instruction over line 39, through the class response unit 77, and by way of the line 57 to the DUP 1-2 unit 55. The DUP 1-2 unit 55 interrupts the circuit between the reading location 13 of the first tape reader 15 and the punching location 33 of the second tape punch 35 thereby terminating duplication of coded information from the master program tape 17 into the subroutine tape 31.

The instruction "BAL TEST' in the master program tape 17 is read at the reading location 13 of the first tape reader 15 and is transmitted along line 39 to the class response unit 77 via line 79 into the computer 87, causing a balance test signal to be generated. The balance test signal is impressed on line 83 which transmits it to a comparing device 85. The comparing device 85 in this step of the example is assumed to block further flow of the signal to the class response unit 77 via line 81. Therefore, the computer 87 and other machine functions remain sensitive to class 0 designated instructions only.

It will be shown at a later point herein in connection with Step 4 how the balance test signal will be completed to cause the computer and other machine functions to respond to class 1.

The next instruction encountered on the master program tape is "READER 2." The computer 87 and class response unit 77 will recognize and respond to this command since they are responsive to class 0 instructions. Therefore, the control of the computer 87 is transferred from the first tape reader 15 to the second tape reader 29.

The instruction "READER 2" is read at reading location 13 of first tape reader 15 and flows along line 41 into the class responsive unit 77. The result of the balance test in the class response unit has not changed the class 0 sensitivity, as explained; therefore, a signal is transmitted along line 75 into a control transfer unit 73. This signal causes the reader controls to transfer; the circuit between the control transfer unit 73, including the line 63 being energized to activate the second tape reader 29, and the circuit between the control transfer unit, including the line 43, being broken to deactivate the first tape reader 15. At this point, the second tape reader 29 is in control for the performance of Step 3.

Figure 5:
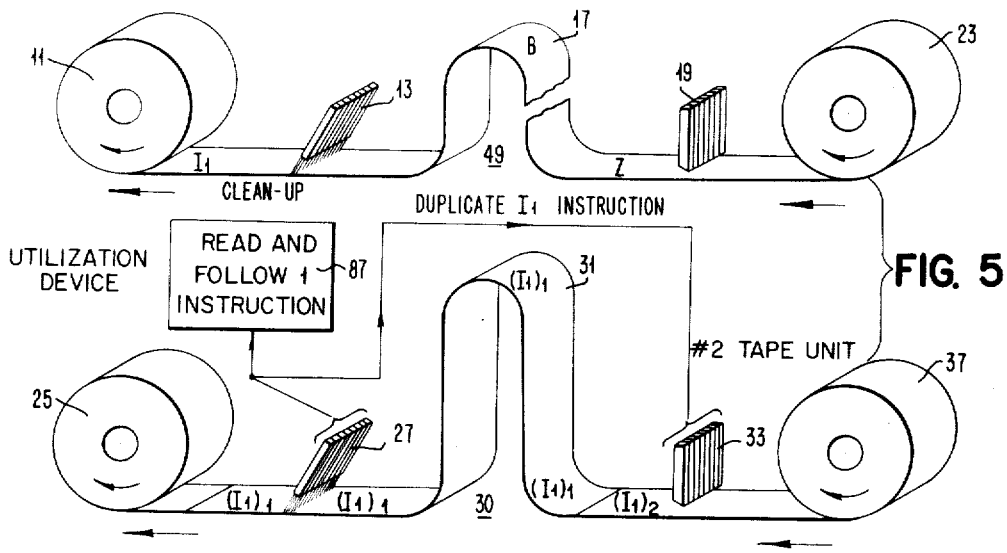
Fig. 5 is a diagrammatic illustration of the third step of the same typical operation.

*Step 3 (Fig. 5).*—As a result of the instruction "READER 2" during Step 2 just described, the second tape reader 29 is actuated and instruction code words are read during Step 3 from the $I_1$ section of the subroutine tape 31 (see Fig. 2). These instructions are duplicates of the $I_1$ instructions which were read during Step 2 from the master program tape 17 and which were at that time acted on by the utilization device 87 and simultaneously duplicated in the subroutine tape 31.

Therefore, the machine will now repeat the program steps which were followed in Step 2, this time, however, the signals will be originated by the $(I_1)_1$ section of the subroutine tape (Fig. 2) by way of the sensing location 27 of the second tape reader 29 (Fig. 1) for transmission over line 71 to the class response unit 77 and over the line 79 to the utilization device 87.

The instruction code "DUP 2" was read at the end of the A section of the master program tape 17 during Step 1 by the sensing location 13 of the first tape reader 15 and the resulting signal was transmitted over line 39 to the class response unit 77, to line 70, to the DUP 2 unit 67, and via line 65 to the second tape punch 35. Therefore, this instruction conditioned a path to allow reduplication of subroutine tape 31 commands simultaneously with machine programming under the influence of these commands during Step 3. This path is as follows: from the reading location 27 of the second tape reader 29, line 59, DUP 2 unit 67 and line 65 to the punch location 33 of the second tape punch 35. The subroutine $(I_1)_2$ which results in the subroutine tape 31 is, therefore, a replica of the subroutine $(I_1)_1$, previously punched into the subroutine tape.

At the end of Step 3, a balance test instruction is initiated from the subordinate tape 31 as follows: from the reading location 27 of the second tape reader 29, over line 71 to the class response unit 77, and over line 79 to the utilization device 87. This balance test instruction was duplicated from the master program tape 17 into the subroutine tape 31 during Step 2, as previously described. The assumption for this example is that a balance test does not result at this time as a result of the balance test instruction. Since no signal occurs, as explained in regard to Step 2, the class response condition remains at 0 and the iteration program, therefore, will be repeated.

Figure 6:
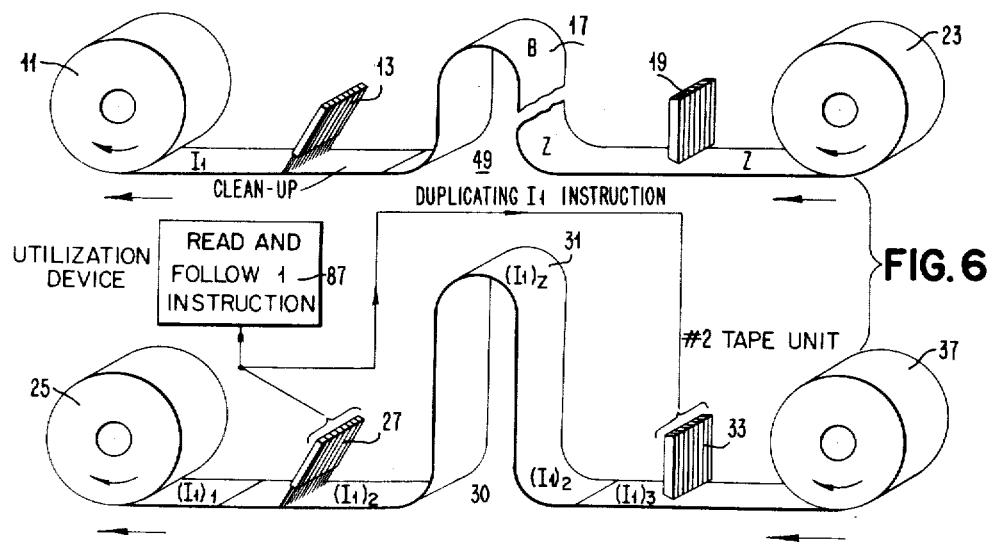
Fig. 6 is a diagrammatic illustration of the fourth step of the same typical operation.

*Step 4 (Fig. 6).*—The first portion of Step 4 is a repetition of Step 3 except the $(I_1)_2$ instructions instead of $(I_1)_1$ instructions are read from the subroutine tape 31 by the second tape reader 29 and are obeyed by the utilization device 87 (see Fig. 2). Also, at the same time $(I_1)_3$ instructions are punched by the second tape punch 35; the $(I_1)_3$ instructions being duplicates of the $(I_1)_2$ instructions. Step 4, therefore, illustrates the utilization of the section $(I_1)_2$ instructions which were duplicated into the subroutine tape 31 from the $(I_1)_1$ section of the same tape during Step 3. At the end of Step 4 an $(I_1)_2$ instruction calls for a balance test. This instruction is a punched duplicate of the same instruction appearing in sections $I_1$ of the master program tape 17 and in section $(I_1)_1$ of the subroutine tape. The path of the signal is from the subroutine tape 31 (see Fig. 1) now in the reading location 27 of the second tape reader 29, over line 71 to the class response unit 77, and over line 79 to the utilization device 87. Let it be assumed that a balance test signal results at this time. Under these conditions a circuit is established from the utilization device 87, through line 83, to the comparing device 85, and through line 81 to the class response unit 77. In a manner to be described in greater detail in the following circuit description, the machine is now conditioned to respond to instructions designated by a class 1 code as well as those designated by a class 0 code.

The next instruction in section $(I_1)_1$ of the subroutine tape 31 is "READER 1." This is a class 1 signal which is not only read but is also acted upon when the circuits are conditioned for class 1 operation. The signal "READER 1" was previously read but was not acted upon since the system has been conditioned to respond to class 0 only. Since there has been a change in class response, the system will now not only read the instruction "READER 1," but it will also act upon the instruction.

Reference to Fig. 1 will show that the "READER 1" instruction is sensed at the reading location 27 of the second tape reader 29 where it is transmitted over line 60 to the class response unit 77 and from thence, via line 75, to the control transfer unit 73 and via line 43 to the first tape reader 15. In the first tape reader 15, the master program tape 17 will now advance to sense a so-called clean-up instruction or instructions whereby the system is conditioned for subsequent programming operations.

*Step 5 (Fig. 7).*—The first instruction code read in the clean-up section of the master program tape 17 (top of Fig. 2) by the first tape reader 15 is "DUP 2 OFF." This instruction flows from the master program tape 17 by way of the reading location 13 of the first tape reader 15 and line 39 to the class response unit 77. From the class response unit 77 a signal is transmitted over line 70 to a DUP 2 unit 67. The DUP 2 unit 67 is connected to the second tape punch 35 such that duplication of instructions in the subroutine tape 31 will now terminate. The manner in which this function is performed will be dealt with in detail in the circuit description to follow.

The second instruction code encountered in the clean-up section of the master program tape is "CLASS 0 OFF." This instruction code conditions the system such that 0 class tape punched instructions will not be obeyed. The tape signal originates in the first tape reader 15 and travels to the class response unit 77 by way of the line 39. Following the "CLASS 0 OFF" instruction, the first tape reader 15 will sense an instruction "READER 2." This signal is transmitted from the first tape reader 15 to the class response unit 77 by way of line 41. The class response unit 77, in turn, transmits a signal to the control transfer unit 73 by way of the line 75, and the control transfer unit 73 will transmit a signal to the second tape reader 29 by way of a line 63. Under these conditions, the second tape reader 29 will pass the subroutine tape 31 therethrough but no signals on which the system can act will be generated since all of the coded commands in the $(I_1)_3$ section of the subroutine tape 31 are class 0 designated commands and it is to be remembered at this time that the system is not responsive to class 0 instructions. Furthermore, there is no further duplication of the subroutine in the subroutine tape 31 since the DUP 2 unit 67 has rendered the second tape punch 35 ineffective, as previously described.

As the subroutine tape 31 is fed through the second tape reader 29, the instruction "READER 1" will be read and since this instruction is a class 1 designation code, previously ignored, it will now cause the tape reader 15 to operate. This is due to the fact that the system is now responsive to class 1 codes. The circuit completed is from the reading location 27 of the second tape reader 29, over line 60 to the class response unit 77 which unit transmits a signal to the control transfer unit 73 via line 75. The control transfer unit 73, in turn, transmits a signal over line 43 and effectively activates the first tape reader 15.

The first tape reader 15 will now sense the instruction "CLASS 0 ON" and immediately thereafter it will sense the instruction "CLASS 1 OFF." These instructions will flow along line 39 to the class response unit 77 with the result that the system will be restored to its original condition, i.e., the condition described under Step 1 at the time of sensing the A program code.

*Step 6 (Fig. 8).*—Step 6 illustrated in Fig. 8 shows the return of the system to straight programming under control of the master program tape 17 which follows the iterative process. Instruction codes at this point are being read from the B section of the master program tape 17, these instructions being transmitted via line 39 (Fig. 1) to the class response unit 77 and via line 79 to the utilization device 87.

*Circuit description*

The circuits required for performing the operations described in the foregoing functional description are illustrated in Figs. 9A, 9B, 10 and 11 to which reference will be had throughout the following description of the circuits involved. In the following description, it will be assumed that the relays CLO (Fig. 11) and CTL1 (Fig. 10) remain energized from a previous machine operation.

The first tape reader 15 is clutched upon closure of the relay point CTL1–7 which provides a circuit from a +40 volt direct current source through relay points CTL1–7 and to the clutch coil CCR1 and ground. This causes the first tape reader 15 to operate and feed the master program tape 17 through the reading mechanism thereof.

Step 1 (see Fig. 2) starts with the above described action such that punched holes in the master program tape, section A, representing coded word instructions, designated class 0, are read in the first tape reader 15. The circuit for reading the class 0 designated instructions will be from the +40 volt direct current source through cam contact CB–A, not through the first tape reader 15 since 0 class is indicated by the absence of any holes in the tape at the normal 6-hole position. Therefore, the circuit that would have continued through points CTL1–6 and through the class response coil CR to ground is broken.

The strap at points CR–1 in the code relays (Fig. 9B) fails to transfer with the result that the circuit is now responsive to the class 0 instructions in the code relay network. The circuit in question is from the +40 volt direct current source through the cam contacts CB–A to the first tape reader 15, through tape holes such as the 1 tape hole, for example, through the CTL1–1 relay point, through coil 1 of the code network relays, through closed relay points CLO1 and then through the relay point CR–1 to ground. This causes a circuit to be completed in the code relay network which extends from the +40 volt direct current source through the points of the cam contacts CB–B (Fig. 11), through transferred relay points 1–1, through now closed relay points 2–2, through now closed relay points 3–3, through now closed relay points 4–5, through now closed relay points 5–9 and through a cable to the utilization device 87 where this particular coded instruction word will be obeyed. This may call for any one of the functions of the computer, such as adding, subtracting, etc.

It is seen from the above, therefore, and it will be seen from examples to follow, that code relays will be actuated from the holes in the tape, representing coded instruction words (and in either class 0 or in class 1, as conditioned). The corresponding code relay points that are actuated will, in turn, cause the utilization device to function by adding, subtracting, etc., if the utilization device is a computer, the path for the signals being along a cable from the code relay network points 5–6 through 5–16. Such commands as these are indicated by the unlettered lines in the A, $A_1$, B and Z parts of the master program tape 17 of Fig. 2.

At the end of the A section of the master program tape 17 (top of Fig. 2) are encountered the control commands "DUP 2" and "DUP 1–2." These, it will be remembered, are class 0 designated instructions. The circuit established for the command "DUP 2" originates from the + 40 volt direct current source through the CB–A cam contacts (Fig. 9A) and not through the 6-hole since class 0 is indicated by the absence of any holes in the tape in the normal 6-hole position. Therefore, the circuit that would have been established through the relay points CTL1–6 and the coil CR to ground is broken. Since the relay points CR–1 in the code relay network are not transferred, the circuit is now responsive to the class 0 instruction in the code relay network as follows: from the +40 volt direct current source through the CB–A contacts, through a 3-hole in the tape, through the relay points CTL1–3, through code relay 3, through relay points CLO–1, through the now closed relay points CR–1 and to ground. This results in transferring the contacts of relay 3 in the code network such that a circuit is established from the +40 volt direct current source through the cam contacts CB–B, through now closed relay points 1–1, through now closed relay points 2–1, through transferred relay points 3–1, through now closed relay points 4–2, through now closed relay points 5–3, through the DUP 2 coil P, and to ground. This effectively latches all the DUP 2 relay points. Energization of the DUP 2 relay thus completes duplicating circuits for all commands during Steps 3 and 4 which will be explained at a later point herein. It also starts the drive mechanism of the second tape punch 35 through the relay points DUP 2–7 (Fig. 9B).

As may be seen by reference to the master program tape 17 of Fig. 2, the next command that is read is "DUP 1–2". The circuit, closed for this command, also originates at the +40 volt direct current source by way of the cam contacts CB–A (Fig. 9A) and not through the first tape reader 15 since class 0 is indicated by the absence of any hole in the tape at the normal 6-hole position. Therefore, the circuit that would have continued through the points CTL1–6 and through the coil CR to ground is broken. Since the relay points CR–1 in the code relay network are not transferred, the circuit is responsive to the class 0 instruction in the code relay network as follows: from the +40 volt direct current source through the CB–A cam contacts, through a 2-hole in the tape, through the CTL1–2 relay points, through code relay 2, through relay points CLO–1, through now closed relay points CR–1 and to ground. This results in transferring the contacts of the relay 2 in the code relay network by means of a circuit from the +40 volt direct current source through the CB–B cam contacts, through the now closed 1–1 relay points, through transferred relay points 2–1, through now closed relay points 3–2, through now closed relay points 4–3, through now closed relay points 5–5, through the DUP (1–2) coil P and to ground. This effectively latches all of the DUP (1–2) relay points.

Energization of the DUP (1–2) relay will complete duplicating circuits for all commands during Step 2 by providing a circuit from the +40 volt direct current source through the CB–A cam contacts, through holes in the tape at the first tape reader 15, through relay points DUP (1–2)1, through DUP (1–2)6 and to the second tape punch 35 where corresponding holes will be punched by the actuation of the punch magnets through their complete path to ground. In addition, it is also seen that relay points DUP (1–2)7 are closed, clutching the second tape punch coil CCP2, this circuit having been previously closed from the instruction "DUP 2."

The next following command in the master program tape 17 (top of Fig. 2) is "READER 1." It will be noted that this is a class 1 command and that it will not be acted on. The circuit will be opened by the now closed CR–1 relay point which is transferred as follows: from the +40 volt direct current source through the cam contacts CB–A (Fig. 9A), through the 6-hole in the master program tape 17, it being remembered that the 6-hole indicates the fact that the command is of class 1 designation, through the relay points CTL1–6, through the class response relay coil CR and to ground thereby transferring class response relay points CR–1 in the code relay network. A circuit is now established from the +40 volt direct current source through the CB–A cam contacts and through holes 3 and 4 in the tape which represent the command "READER 1." For the purpose of this description, it will be sufficient to trace the circuit established through the 3 tape hole since the one established through the 4-hole of the tape is similar. The circuit for the 3-hole is through the relay points CTL1–3, through the code relay 3, through the relay points CLO–1, and to the transferred relay points CR–1 at which the circuit has been interrupted.

The iterative program $I_1$ will be read from the master program tape 17 during Step 2. As the iterative instructions $I_1$ are read by the first tape reader 15, they are transmitted along two circuits. The first of these extends to the utilization device 87, as previously described, and the second extends to the second tape punch 35, as also previously described.

The last instruction word in the iterative section $I_1$ of the master program tape 17 is the command "BAL TEST" and "DUP 1–2 OFF"; this being a class 0 designation instruction which requires transfer of the points of relays 2 and 5 in the code relay network. Here again, it will be sufficient to trace the circuit for one of these relays since the other is similar and will be evident. Therefore, a circuit is established for the 2 relay from the first tape reader 15 which extends from the +40 volt direct current source through the CB–A cam contact points. Here again, it should be noted that the circuit is not established through the first tape reader 15 since class 0 instructions are indicated by the absence of any holes in the tape at the 6-hole position. Therefore, the circuit that would have continued through relay points CTL1–6 and through the class response coil CR and to ground is broken. Since the relay points CR–1 are not transferred, the circuit is now responsive to the class 0 instructions in the code relay circuitry as follows: from the +40 volt direct current source through the CB–A cam contacts, through the 2-hole in the master program tape 17 being read in the first tape reader 15, through CTL1–2 relay points, through code relay 2, through relay point CLO–1 and through now closed relay point CR–1 to ground. The code relay 2 is thereby energized.

Energization of the 2 code relay conditions a circuit from the +40 volt direct current source through the cam contacts CB–B, through now closed relay points 1–1, through transferred relay points 2–1, through now closed relay points 3–2, through now closed relay points 4–3 and through transferred relay points 5–5 where the circuit branches in two directions. One branch of the circuit provides a path to ground through the coil of the relay DUP (1–2) DO. This breaks a circuit for duplicating the iterative $I_1$ instructions of the master program tape 17 which is being read in the first tape reader 15 into subroutine tape 31 at the second tape punch 35. In effect, the circuit extends from the +40 volt direct current source through the cam contacts CB–A, through the 2-hole of the master program tape 17 in the first tape reader 15, to the open relay points DUP (1–2)2 thereby breaking the circuit between the first tape reader 15 and the second tape punch 35. The other branch completes its path to ground along line 79 to the utilization device 87 causing a balance test to originate along line 83 which is transmitted to the comparing device 85. If the result of the balance test is plus, no class change results. If, however, the result of the balance test is minus, a circuit to ground is established through relay coil CL1 causing its points CL1–1 to close in the code relay circuitry. Under these conditions, the tape reader will respond to either class 0 or to class 1 instructions in the code relay network, if a negative belance test is sensed. It is assumed in Step 2 when a positive balance test resulted that no change in class response is, therefore, effected.

The instruction word following the iterative section $I_1$ of the master program tape 17 is "READER 2." Since this instruction is of class 0 designation, it will cause control of the program to be transferred from the master program tape 17 being read in the first tape reader 15 such that the subroutine tape 31 in the second tape reader 29 is utilized. The circuitry for accomplishing this is set up by the transfer of the relay points of the code relays 3, 4 and 5. Here again, since the circuit sets are established by such transfer they are generally similar, only the circuits for relay 3 will be traced from the first tape reader 15, and these circuits are as follows: from the +40 volt direct current source and through the cam contacts CB–A. It is to be noted again that the circuit is not completed through the first tape reader 15 since the class 0 command being dealt with is indicated by the absence of any holes in the tape at the 6-hole position. Under these conditions, the circuit that would have continued through the relay points CTL1–6 and through the coil of the class response relay CR to ground is broken.

In light of the fact that the class response relay points CR–1 are not transferred, and the circuit is now responsive to the class 0 instruction in the code relay circuitry, a circuit will be established as follows: +40 volt direct current source through the CB–A cam contacts, through a 3-hole in the tape, through the relay points CTL1–3, through the code relay 3, through relay points CLO–1 and through the now closed CR–1 points of the class response relay to ground. The code relay network circuit will be completed from the +40 volt direct current source through the cam contacts CB–B, through now closed relay points 1–1, through now closed relay points 2–1, through the transferred relay points 3–1, through the transferred relay points 4–2, through the transferred relay points 5–4 and through the coil of the reader 2 relay and to ground. This causes the reader transfer network (Fig. 10) to switch control of the program from the first reader 15 to the second reader 29 as follows: from the +40 volt direct current source through the CB–C cam contacts, through the now closed points of the reader 2 relay. The CTL2 relay is energized thereby causing all of the CTL2–1 through CTL2—8 relay points to latch; at the same time, the CTL1–8 points will drop out.

The instruction "READER 2" initiates the 3rd step of the process during which the first tape reader 15 is inactivated and the second tape reader 29 is activated. During this step, the subroutine tape 31 will be read in the sensing location of the second tape reader 29. The second tape reader 29 will now read the subroutine $(I_1)_1$ punched during the second step of the process. Note that due to the setting up of the latch relay DUP 2 at a previous point, all $(I_1)_1$ instructions read at the second tape reader 29 will be duplicated into the subroutine tape 31 by the second tape punch 35 as the same data is being read from the tape.

The first instruction in the subroutine tape, as seen at the bottom of Fig. 2, is "READER 1." This instruction is identified as belonging to class 1 and, therefore, it will not be obeyed by the system as it is being read in the second tape reader. The circuit will be opened at the now closed class response relay contact CR–1 which is transferred by a circuit extending from the +40 volt direct current source through the CB–A cam contacts, through the 6-hole in the tape (representing a class 1 designation), through relay point CTL2–6, through the coil of the class response relay CR and to ground; from the +40 volt direct current source through the CB–A cam contacts, and through holes 3 and 4 in the tape. Tracing the circuit through hole 3 will suffice to illustrate both circuits that are made through the holes now being sensed. This circuit is through the relay points CTL2–3, through the code relay 3, through the relay point CLO–1, to transferred relay points CR–1 where the circuit is broken.

The next instruction and a number of instructions thereafter, as seen in the subroutine tape of Fig. 2, will be composed of the $(I_1)_1$ subroutine coded word instructions which are being read by the second tape reader 29 as follows: from the +40 volt direct current source through the cam contacts CB–A, to the second tape reader 29, through tape holes such as the 1 tape hole, for example, through the CTL2–1 relay points, through the coil of the code relay 1, and through relay points CLO–1 and then through the class response relay points CR–1 to ground whereby the circuit is completed. This causes a circuit to be completed in the code relay network which extends from the +40 volt direct current source through the CB–B cam contacts, through the transferred relay points 1–1, through the now closed relay points 2–2, through the now closed relay points 3–3, through the now closed relay points 4–5, through the now closed relay points 5–9, through the cable to the utilization device 87 where this particular coded instruction word will be acted on. This instruction may call for any one of the functions, such as adding, subtracting, etc., if the utilization device is a computer.

The last instruction of the $(I_1)_1$ portion of the subroutine tape is "BAL TEST" and "DUP 1–2 OFF." This instruction, as previously stated, is an instruction of class 0; therefore, the instruction will be obeyed and another balance test will be made. The command "DUP 1–2 OFF" is ineffective at this time since its circuit was interrupted in Step 2 of the process. It may be assumed that the result of the balance test is positive so that class 0 conditions and other iterations will be performed again during Step 4. The balance test function requires transfer of the relay network points on code relays 2 and 5. The circuit for the relay 2, exemplary also for that of relay 5, can be traced from the +40 volt direct current source and through the CB–A cam contacts. The circuit that would otherwise have continued through the relay points CTL1–6 and through the class response coil CR to ground is broken. The CR–1 points of the class response relay do not transfer and the circuit is, therefore, responsive to the class 0 instructions in the code relay circuitry as follows: from the +40 volt direct current source through the CB–A cam contacts, through a 2-hole in the subroutine tape 31 now being read in the second tape reader 29, through the CTL2–2 relay points, through the code relay 2, through relay points CLO–1, through the now closed points CR–1 of the class response relay. Code relay 2 is, therefore, energized. A further circuit is traced from the +40 volt direct current source through the cam contacts CB–B, through the now closed relay points 1–1, through the transferred relay points 2–1, through the now closed relay points 3–2, through the now closed relay points 4–3, through the now transferred relay points 5–5, completing its path to ground along line 79 in the utilization device 87. This causes a pulse to be transmitted along line 83 from the utilization device 87 to the comparing device 85. It is assumed, as previously stated, that the result of the balance test will be positive. Therefore, no change in class response will take place at this time.

As a result of the balance test step just performed at the end of Step 3, tape will continue to be read by the second tape reader 29 such that the iterative process will be repeated. All portions of ensuing Step 4 are a repetition of those performed in Step 3, except that the $(I_1)_2$ instructions instead of the $(I_1)_1$ instructions, are now being read in the second tape reader 29 and are being obeyed by the utilization device 87. At the same time, the $(I_1)_3$ instructions will be punched by the second tape punch 35 instead of the instructions $(I_1)_2$ which were produced during the preceding step.

Step 4 illustrates the utilization of subroutine tape section $(I_1)_2$ instructions which were punched into the tape 31 as a duplicate of the $(I_1)_1$ instructions of the subroutine tape 31 during Step 3, and it illustrates the function and circuitry involved when a negative balance test is obtained.

The last instructions in section $(I_1)_2$ of the subroutine tape 31 are "BAL TEST" and "DUP 1–2 OFF." These instructions, it will be remembered, are in class 0. Therefore, the instruction will be obeyed and another balance test will be made. The command "DUP 1–2 OFF" will be ineffective at this time since the command was effectively acted on during Step 2 of the process and circuit conditions resulting from such action are still the same.

Let it be assumed that when the balance test is made at this time, the result is negative such that another iteration will not be performed. The class response will change at this point and control of the program will be switched back to the master program tape 17. The balance test circuits require transfer of relay network points controlled by code relays 2 and 5. An examination of the circuits controlled by code relay 2 will suffice to explain the condition of the entire circuit. When code relay 2 is energized, a circuit is established from the +40 volt direct current source through the CB–A cam contacts. Class 0 response is indicated by the absence of any holes in the tape at the 6-channel. The circuit that would otherwise have continued through the relay points CTL2–6 and through the class response coil CR is broken. By reason of this fact, the CR–1 relay point in the code relay network failed to transfer and the circuit is now responsive to class 0 instructions in the code relay circuitry as follows: from the +40 volt direct current source, through the CB–A cam contacts, through a 2-hole in the subroutine tape 31 now being read in the second tape reader 29, through the CTL2–2 relay points, through code relay 2, through relay point CL0–1, and through the now closed CR–1 points of the class response relay to ground. Thus, code relay 2 is energized.

The complete code relay network path will then be from the +40 volt direct current source through the CB–B cam contacts, through the now closed relay points 1–1, through the transferred relay points 2–1, through the now closed relay points 3–2, through the now closed relay points 4–3, and through the transferred relay points 5—5 thereby completing a path to ground along line 79 in the utilization device 87, causing a balance test to originate along line 83 from the utilization device 87 to the comparing device 85. It is assumed, as previously stated, that the result of the balance test at this time will be negative. Therefore, a circuit is established through the coil of relay CL1, causing its points CL1–1 in the code relay network to close. The circuits are now conditioned that both the first tape reader 15 and the second tape reader 29 will respond to either class 0 or class 1 instructions at this time and will continue to do so until an instruction is received which will turn OFF response to either class 0 or class 1 commands.

The next instruction read from the subroutine tape 31 during Step 4 of the process is the first instruction in the $(I_1)_3$ section of the tape, i.e., "READER 1." This instruction, it will be remembered, is a class 1 instruction. Due to the balance test just completed, the second tape reader 29 will respond to this instruction by reason of a circuit which extends from the +40 volt direct current source through the CB–A cam contacts, through holes 3 and 4 in the subroutine tape 31 at the second tape reader 29. Here again, the tracing of the circuit through the 3-hole will be sufficient to illustrate the circuits of both tape holes. The signal passes through relay points DUP 2–3 to the second tape punch 35 where the path to ground will be completed through the punch magnet for punching the 3-hole. The 4-hole will be punched in a similar manner as will the 6-hole representing the class 1 designation of the instruction. The circuit for the latter function is from the +40 volt direct current source through the CB–A cam contacts, through hole 6 in the subroutine tape at the second tape reader 29, through the CTL2–6 relay points, through the class response relay CR which causes the transfer of the class response relay points CR–1 in the code relay network. A circuit is established from the +40 volt direct current source through the CB–A cam contacts, through holes 3 and 4 in the subroutine tape 31 at the second tape reader 29. The circuit through the 3-hole of the tape can be traced through relay points CTL2–3, through code relay 3, through relay points CL1–1, through the transferred relay points CR–1 of the class response relay such that the code relay 3 is energized over a circuit extending from the +40 volt direct current source through the CB–B cam contacts, through the now closed relay points 1–1, through the now closed relay points 2–1, through the transferred relay points 3–1, through the transferred relay points 4–2, through the now closed relay points 5–4 and to the coil of the reader 1 relay to ground. This establishes a circuit in the reader transfer network as follows: from the +40 volt direct current source through the CB–C cam contacts, through the reader 1 relay points, the circuit branching through the coil P of the CTL1 relay to ground, thereby closing and latching all the CTL1 relay points and clutching the first tape reader 15 by energizing its clutch coil CCR–1. A circuit is also completed through the relay points CTL2–8, through the coil DO of the CTL2 relay and to ground. This causes the points of the CTL2 relay to drop out thereby effectively stopping the second tape unit.

During Step 5 at which the clean-up instructions are sensed, the first tape reader 15 and the master program tape 17 are in command of the operation. It will be remembered that the last instruction read from the master program tape 17 was "READER 2." Therefore, the instruction which will be read at this time is the first instruction in the clean-up section of the tape (see Fig. 2), i.e., the instruction "DUP 2 OFF." This instruction is identified as being of the class 1 category. The circuits responsive to the instruction extend from the +40 volt direct current source through the CB–A cam contacts, through a 6-hole in the tape since a 6-hole is representative of a class 1 command, through relay points CTL1–6, through the coil of the class response relay CR and to ground causing relay point CR–1 to transfer in the code relay network. The instruction "DUP 2 OFF" has holes in the 3 and 5-channel of the tape completing the following circuit: from the +40 volt direct current source through the CB–A cam contacts, through the 3-hole in the master program tape 17, through the CTL1–3 relay points, through the code relay 3, through the CL1–1 relay points and through transferred points CR–1 of the class response relay to ground. The circuit through the 5-hole of the tape can be traced in the same fashion. The sensing of the 3 and 5-holes sets up the following circuits in the code relay network: from the +40 volt direct current source through the CB–B cam contacts, through the now closed relay points 1–1, through the now closed relay points 2–1, through the transferred relay points 3–1, through the now closed relay points 4–2, through the transferred relay points 5–3 and to ground, through the coil of the DUP 2 relay DO causing all the DUP 2 relay points to open. This will cause the tape mechanism of the second tape punch 35 to stop feeding tape. It also breaks the circuits between the second tape reader 15 and the second tape punch such that further duplication of the iterative program cannot continue.

The next clean-up instruction read from the master program tape 17 is "CLASS 0 OFF." This instruction is a class 1 instruction and the circuits are as follows: from the +40 volt direct current source through the CB–A cam contacts, through the 6-hole in the tape which represents the fact that the command is of class 1, through relay points CTL1–6, through the class response relay CR to ground, causing relay points CR–1 to transfer in the code relay network. The instruction "CLASS 0 OFF" has a hole in the 4-channel of the tape through which is closed the following circuit: from the +40 volt direct current source through cam contacts CB–A, through the 4-hole in the master program tape 17 now being read in the first tape reader 15, through the relay points CTL1–4, through code relay 4, through relay points CL1–1, through transferred relay points CR–1 to ground. This causes the code relay 4 to transfer its points from the following circuit: from the +40 volt direct current source through the CB–B cam contacts, through the now closed relay points 1–1, through the now closed relay points 2–1, through the now closed relay points 3–1, through the transferred relay points 4–1, through the now closed relay points 5–2 and through the DO coil of the relays CLO thereby dropping out the CLO1 relay points in the code relay network.

The next instruction read by the first tape reader is "READER 2." This instruction is in the class 1 response category. The class response circuitry in the code relay network is now conditioned for class 1 response only, the code relay circuitry extending from the +40 volt direct current source through the CB–A cam contacts, through holes 3, 4 and 5 in the master program tape 17, which holes represent the instruction "READER 2." All three of the circuits through the tape holes mentioned can be illuminated by tracing the circuit through the 3-hole. This circuit, therefore, extends through the first tape reader 15, through the relay points CTL1–3, through code relay 3, through relay points CL1–1 and through transferred points CR–1 of the class response relay. This causes the code relay 3 to transfer (and by similar circuits also code relays 4 and 5) due to a circuit from the +40 volt direct current source through the CB–B cam contacts, through the now closed relay points 1–1, through the now closed relay points 2–1, through the transferred relay points 3–1, through the transferred relay points 4–2 and through transferred relay points 5–4 and the coil of the reader 2 relay. This causes the points of the reader 2 relay to form the following circuit in the reader transfer network: from the +40 volt direct current source through the CB–C cam contacts, through the reader 2 relay points from which the circuit branches, through the P coil of the CTL2 relay causing all of the points of that relay to close and through the relay points CTL1–8 and the DO coil of the relay CTL1 whereby the CTL1 relay points are dropped out. As a result, therefore, of the instructions "READER 2," the second tape reader 29 is started and the first tape reader 15 is stopped. The second tape reader 29 will now feed the subroutine tape 31 without following the instructions in the tape section $(I_1)_3$ since these are class 0 designations and the class 0 response is OFF, as described. In similar manner, duplication of the $(I_1)_3$ section of the subroutine tape does not occur since the first clean-up, as stated, was "DUP 2 OFF."

After the $(I_1)_3$ section of the subroutine tape 31 has been fed through the second tape reader 29, the instruction "READER 1" will be sensed. This is a class 1 designated command, previously ignored, but which will now be obeyed by reason of the circuit from the +40 volt direct current source, the CB–A cam contacts, a 6-hole in the subroutine tape 31 at the second tape reader 29, the relay points CTL2–6, and the class response relay, causing the transfer of the class response relay point CR–1 in the code relay section. Further circuits involved extend from the +40 volt direct current source through the cam contacts CB–A, through the 3 and 4 holes in the tape 31 at the second tape reader 29. Here again, the circuit established through the 3-hole will be traced. This circuit extends through the relay points CTL2–3, through the code relay 3, through the CL1–1 relay points, through the transferred CR–1 points of the class response relay to ground. This results in energizing the code relay 3, and code relay 4 is energized in parallel circuits. The circuit continues from the +40 volt direct current source through the cam contacts CB–B, through the now closed relay points 1–1, through the now closed relay points 2–1, through the transferred relay points 3–1, through the transferred relay points 4–2 and through the now closed relay points 5–4 to the coil of the reader 1 relay and thence to ground.

This causes a circuit in the reader transfer network to be established along the following path: from the +40 volt direct current source through the cam contacts CB–C, through the points of the reader 1 relay, the circuit branching through the P coil of the CTL1 relay to ground, to latch all the CTL1 relay points which effectively clutch the first tape reader 15 into operation. A second circuit can be traced from the CTL2–8 relay points through the DO coil of the CTL2 relay, causing all of the CTL2–2 relay points to drop out such that the second tape reader 29 will be brought to a halt. The first tape reader 15 will now take over the program and the instruction it next senses is the "CLASS 0 ON." This instruction belongs to class 1 and will be obeyed by a circuit from the +40 volt direct current source through the CB–A cam contacts, through a 6-hole in the tape which represents class 1 information, through the reader 15, through relay points CTL1–6 and through the coil of the class response relay CR to ground, causing the point CR–1 of the class response relay to transfer in the code relay circuits.

The instruction "CLASS 0 ON" has holes in the tape at the 4 and 5-channels which cause the following code relay network circuit action: from the +40 volt direct current source through the CB–A cam contacts, through holes 4 and 5 in the master program tape 17 now being read in the first tape reader 15. The circuit through the 4-hole of the tape, for example, extends through the relay points CTL1–4, through the code relay 4, through the relay points CL1–1 and through the transferred points CR–1 of the code response relay to ground. This energizes the code relay 4. The code relay 5 is energized by a parallel circuit as can be seen from the circuit diagram. This action conditions the following code relay network circuitry: from the +40 volt direct current source through the came contacts CB–B, through the now closed relay points 1–1, through the now closed relay points 2–1, through the now closed relay points 3–1, through the transferred relay points 4–1, through the transferred relay points 5–2 and to the P coil of the class 0 relay. This causes a closure of the points CLO–1 relay in the code relay circuit network. Therefore, the code relay circuitry is now responsive to instructions in either class 0 or in class 1.

The last instruction in the clean-up section of the master program tape 17 is the command "CLASS 1 OFF." This is a class 0 designated instruction and will be read at the first tape reader 15 over the following circuits: from the +40 volt direct current source through the cam contacts CB–A not through the first tape reader 15 since class 0 commands are identified by the absence of any holes in the tape at the 6-hole position. Therefore, the circuits that would have extended through the relay points CTL1–6 and through the coil of the class response relay CR are broken. Under these conditions, the relay point CR–1 in the code relay network failed to transfer and the circuit is now responsive to the class 0 instruction in the code relay network. The instruction "CLASS 1 OFF" includes a hole in the 5-channel tape through which a circuit is completed from the +40 volt direct current source through the cam contacts CB–A, through the 5-hole in the master program tape 17 being read in the first tape reader 15, through the CTL1–5 relay points and to the code relay 5 and through the relay points CLO–1, through the now closed relay points CR–1 to ground. This causes relay 5 to transfer its points in the code network circuitry by reason of a circuit from the +40 volt direct current source through the cam contacts CB–B, through the now closed relay points 1—1, through the now closed relay points 2–1, through the now closed relay points 3–1, through the now closed relay points 4–1, through the transferred relay points 5–1 and to the DO coil of the relay CL1. This drops out the CL1–1 points in the code relay circuits. The machine is now restored to its original condition as a result of the response to the tape clean-up signals.

Having been restored to its original condition as a result of the tape clean-up operation, the system is now prepared to pass on to instructions B in the master program tape 17. These instructions will proceed similar to the instructions obtained from the A program of the tape, as described hereinabove. That is to say; the B part of the tape program will now go through steps similar to those described in respect to the A routine, reading and acting upon instructions, reproducing subroutines and acting upon such subroutines in an iterative fashion until the periodic balance tests determine that the proper number of iterations have been performed. The order of the instructions written and illustrated in the A program of the tape 17 are applicable to any section A, B or Z of the tape such that the subroutines of such program will, in effect, be self-examining for the number of iterations required to complete a given subroutine, switching readers and punches accordingly until the system is restored to its original class 0 response before encountering another routine program of the tape, be it B, C or Z.

Dashed lines interconnect the first tape reader 15 and the first tape punch 21 through relay points DUP 1–1, through DUP 1–6. The relay for these points is shown at the bottom of Fig. 9B, which relay DUP 1 can be energized and de-energized by closing or opening switch 1. It will be seen that if the DUP 1 relay is energized and the points thereof are closed, the first tape reader 15 and the first tape punch 21 will be directly interconnected such that an entire program tape being read in the first tape reader 15 can be reproduced in the first tape punch 21. This is a desirable feature in that certain computers and other utilization device problems may have different perimeters to be applied to a whole identical program.

While the fundamentally novel features of the invention have been illustrated and described in connection with specific embodiments of the invention, it is believed that these embodiments will enable others skilled in the art to apply the principles of the invention in forms departing from the exemplary embodiments herein, and such departures are contemplated by the claims.

What is claimed is:

1. In a system adapted to perform iterative routines under control of a program record and produce a response signal when the number of iterations required to complete a given routine have been performed: a master program record reading station adapted to read a program record having recorded therein an iterative subroutine, a subroutine program record reproducer connected to said master program reading station, means for recognizing the presence of an iterative subroutine program record in said master record reading station, means responsive to said recognizing means adapted to energize said subroutine program record reproducer and condition said connections between said master program record reader and said subroutine program record reproducer whereby a subroutine record being read in said master program reading station is reproduced at said subroutine program record reproducer, a second program record reader adapted to read subroutine program records reproduced in said subroutine program record reproducer, connections between said subroutine program record reproducer and said second program record reader adapted to reproduce in said subroutine record reproducer a subroutine program record being read in said second program reader, means for cyclically operating said subroutine record reproducer and said subroutine program record reader whereby subroutine program record reproduction and reading is cyclically repeated, and means controlled by a response signal indicating the completion of an iterative routine for disabling said subroutine program record reproducer and said second program record reader.

2. In a system adapted to perform iterative routines under control of a program record tape and produce a response signal when the number of iterations required to complete a given routine have been performed: a master program record tape reading station adapted to read a program record tape having recorded therein an iterative subroutine, a subroutine program record tape reproducer connected to said master program record tape reading station, means for recognizing the presence of an iterative subroutine program record in said master record tape reading station, means responsive to said recognizing means adapted to energize said subroutine program record tape reproducer and condition said connections between said master program record tape reader and said subroutine program record tape reproducer wereby a subroutine record tape being read in said master program tape reading station is reproduced in a subroutine program record tape in said subroutine program record tape reproducer, a second program record tape reader adapted to read subroutine program records reproduced in said subroutine program record tape reproducer, connections between said subroutine program record tape reproducer and said second program record tape reader adapted to reproduce in a subroutine program record tape in said subroutine record tape reproducer a subroutine program record being read in said second program tape reader, means for cyclically operating said subroutine program record tape reproducer and said subroutine program record tape reader whereby subroutine program record tape reproduction and reading is cyclically repeated, and means controlled by a response signal indicating the completion of an iterative routine for disabling said subroutine program record tape reproducer and said second program record tape reader.

3. In a system adapted to perform iterative routines under control of a punched program record tape and produce a response signal when the number of iterations required to complete a given routine have been performed: a master punched program record tape reading station adapted to read a punched program record tape having recorded therein an iterative subroutine, a subroutine program record tape punch connected to said master program record tape reading station, means for recognizing the presence of an iterative subroutine program record in said master record tape reading station, means responsive to said recognizing means adapted to energize said subroutine program record tape punch and condition said connections between said master program record tape reader and said subroutine program tape punch whereby a subroutine record being read in said master program tape reading station is punched in a subroutine record tape in said subroutine program tape punch, a second program record reader adapted to read subroutine program records reproduced in said subroutine program record tape punch, connections between said subroutine program record tape punch and said second program record tape reader adapted to reproduce in a subroutine program record tape in said subroutine record tape punch a subroutine program record being read in said second program tape reader, means for cyclically operating said subroutine record tape punch and said subroutine program record tape reader whereby subroutine program record tape punching and reading is cyclically repeated, and means controlled by a response signal indicating the completion of an iterative routine for disabling said subroutine program tape punch and said second program record tape reader.

4. In a system adapted to perform iterative routines under control of a program record and produce a response signal when the number of iterations required to complete a given routine have been performed: a master program record reading station adapted to read a program record having recorded therein an iterative subroutine, a subroutine program record reproducer connected to said master program reading station, means for recognizing the presence of an iterative subroutine program record in said master record reading station, means responsive to said recognizing means adapted to energize said subroutine program record reproducer and condition said connections between said master program record reader and said subroutine program record reproducer whereby a subroutine record being read in said master program reading station is reproduced at said subroutine program record reproducer, a second program record reader adapted to read subroutine program records reproduced in said subroutine program record reproducer, connections between said subroutine program record reproducer and said second program record reader adapted to reproduce in said subroutine record reproducer a subroutine program record being read in said second program reader, means for cyclically operating said subroutine record reproducer and said subroutine program record reader whereby said subroutine program record reproduction and reading is cyclically repeated, and means controlled by a response signal indicating the completion of an iterative routine for disabling said subroutine program record reproducer and said second program record reader and for reactivating said master program record reading station.

5. In a system adapted to perform iterative routines under control of a program record tape and produce a response signal when the number of iterations required to complete a given routine have been performed: a master program record tape reading station adapted to read a program record tape having recorded therein an iterative subroutine, a subroutine program record tape reproducer connected to said master program record tape reading station, means for recognizing the presence of an iterative subroutine program record in said master record tape reading station, means responsive to said recognizing means adapted to energize said subroutine program record tape reproducer and condition said connections between said master program record tape reader and said subroutine program record tape reproducer whereby a subroutine record being read in said master program tape reading station is reproduced in a subroutine program record tape in said subroutine program record tape reproducer, a second program record tape reader adapted to read subroutine program records reproduced in said subroutine program record tape reproducer, connections between said subroutine program record tape reproducer and said second program record tape reader adapted to reproduce in a subroutine program record tape in said subroutine record tape reproducer a subroutine program record being read in said second program tape reader, means for cyclically operating said subroutine record tape reproducer and said subroutine program record tape reader whereby subroutine program record tape reproduction and reading is cyclically repeated, and means controlled by a response signal indicating the completion of an iterative routine for disabling said subroutine program record tape reproducer and said second program record tape reader and for reactivating said master program record reading station.

6. In a system adapted to perform iterative routines under control of a punched program record tape and produce a response signal when the number of iterations required to complete a given routine have been performed: a master punched program record tape reading station adapted to read a punched program record tape having recorded therein an iterative subroutine, a subroutine program record tape punch connected to said master program record tape reading station, means for recognizing the presence of an iterative subroutine program record in said master record tape reading station, means responsive to said recognizing means adapted to energize said subroutine program record tape punch and condition said connections between said master program record tape reader and said subroutine program tape punch whereby a subroutine record being read in said master program tape reading station is punched in a subroutine record tape in said subroutine program tape punch, a second program record reader adapted to read subroutine program records reproduced in said subroutine program record tape punch, connections between said subroutine program record tape punch and said second program record tape reader adapted to reproduce in a subroutine program record tape in said subroutine record tape punch a subroutine program record being read in said second program tape reader, means for cyclically operating said subroutine record tape punch and said subroutine program record tape reader whereby subroutine program record tape punch and reading is cyclically repeated, and means controlled by a response signal indicating the completion of an iterative routine for disabling said subroutine program tape punch and said second program record tape reader and for reactivating said master program record reading station.

7. In a system adapted to perform iterative routines under control of a program record and produce a response signal when the number of iterations required to complete a given routine have been performed: a master program record having recorded therein an iterative subroutine, a master program record reading station adapted to read said master program record, a subroutine program record reproducer connected to said master program reading station, a subroutine record blank in said subroutine program record reproducer, means in said master program record reading station for recognizing the presence of an iterative subroutine program in said master record, means responsive to said recognizing means adapted to energize said subroutine program record reproducer and condition said connections between said master program record reader and said subroutine program record reproducer whereby a subroutine record being read from said master program record is reproduced in said record blank at said subroutine program record reproducer, a second program record reader adapted to read subroutine program records reproduced in said subroutine program record reproducer, connections between said subroutine program record reproducer and said second program record reader adapted to reproduce in said record blank in said subroutine record reproducer a subroutine program record being read in said second program reader, means for cyclically operating said subroutine record reproducer and said subroutine program record reader whereby said subroutine program record reproduction and reading is cyclically repeated, and means controlled by a response signal indicating the completion of an iterative routine for disabling said subroutine program record reproducer and said second program record reader.

8. In a system adapted to perform iterative routines under control of a program record and produce a response signal when the number of iterations required to complete a given routine have been performed: a master program tape having recorded therein an iterative subroutine, a master program tape reading station adapted to read said master program tape, a subroutine program tape reproducer connected to said master program reading station, a blank subroutine tape in said subroutine program tape reproducer, means in said master program tape reading station for recognizing the presence of an iterative subroutine program in said master program tape, means responsive to said recognizing means adapted to energize said subroutine program tape reproducer and condition said connections between said master program tape reader and said subroutine program tape reproducer whereby a subroutine tape record being read from said master program tape is reproduced in said blank tape at said subroutine program tape reproducer, a second program tape reader adapted to read a subroutine program tape reproduced in said subroutine program tape reproducer, connections between said subroutine program tape reproducer and said second program tape reader adapted to reproduce in said blank tape in said subroutine tape reproducer a subroutine program record being read in said second program reader, means for cyclically operating said subroutine tape reproducer and said subroutine tape reader whereby said subroutine program tape reproduction and reading is cyclically repeated, and means controlled by a response signal indicating the completion of an iterative routine for disabling said subroutine program tape reproducer and said second program tape reader.

9. In a system adapted to perform iterative routines under control of a program record and produce a response signal when the number of iterations required to complete a given routine have been performed: a master program record having recorded therein an iterative subroutine, a master program record reading station adapted to read said master program record, a subroutine program record reproducer connected to said master program reading station, a subroutine record blank in said subroutine program record reproducer, means in said master program record reading station for recognizing the presence of an iterative subroutine program in said master record, means responsive to said recognizing means adapted to energize said subroutine program record reproducer and condition said connections between said master program record reader and said subroutine program record reproducer whereby a subroutine record being read from said master program record is reproduced in said record blank at said subroutine program record reproducer, a second program record reader adapted to read subroutine program records reproduced in said subroutine program record reproducer, connections between said subroutine program record reproducer and said second program record reader adapted to reproduce in said record blank in said subroutine record reproducer a subroutine program record being read in said second program reader, means for cyclically operating said subroutine record reproducer and said subroutine program record reader whereby said subroutine program record reproduction and reading is cyclically repeated, and means controlled by a response signal indicating the completion of an iterative routine for disabling said subroutine program record reproducer and said second program record reader and for reactivating said master program record reading station.

10. In a system adapted to perform iterative routines under control of a program record and produce a response signal when the number of iterations required to complete a given routine have been performed: a master program record having recorded therein an iterative subroutine, a first instruction at the beginning of said subroutine and a second instruction at the end of said subroutine, a master program record reading station adapted to read said master program record, a subroutine program record reproducer connected to said master program reading station, a subroutine record blank in said subroutine program record reproducer, means in said master program record reading station responsive to said first instruction adapted to energize said subroutine program record reproducer and condition said connections between said master program record reader and said subroutine program record repoducer whereby a subroutine and said instructions record being read from said master program record are reproduced in said record blank at said subroutine program record reproducer, a second program record reader adapted to read subroutine program records reproduced in said subroutine program record reproducer, connections between said subroutine program record reproducer and said second program record reader adapted to reproduce in said record blank in said subroutine record reproducer a subroutine program record and said instructions being read in said second program reader, means for cyclically operating said subroutine record reproducer and said subroutine program record reader whereby said subroutine program record reproduction and reading is cyclically repeated, circuits in said second program reader normally unresponsive to said second instruction, means controlled by a response signal indicating the completion of an iterative routine for rendering said circuits responsive to said second instruction, and means responsive to said circuits when rendered responsive to said second instructions for activating said master program record reading station.

11. In a system adapted to perform iterative routines under control of a program record and produce a response signal when the number of iterations required to complete a given routine have been performed: a master program record having recorded therein an iterative subroutine and an operational signal following said subroutine, a master program record reading station adapted to read said master program record, a subroutine program record reproducer connected to said master program reading station, a subroutine record blank in said subroutine program record reproducer, means for energizing said subroutine program record reproducer and condition said connections between said master program record reader and said subroutine program record reproducer whereby a subroutine record being read from said master program record is reproduced in said record blank at said subroutine program record reproducer, a second program record reader adapted to read subroutine program records reproduced in said subroutine program record reproducer, connections between said subroutine program record reproducer and said second program record reader adapted to reproduce in said record blank in said subroutine record reproducer a subroutine program record being read in said second program reader, means for cyclically operating said subroutine record reproducer and said subroutine program record reader whereby said subroutine program record reproduction and reading is cyclically repeated, circuits connected to said second program reader normally unresponsive to said operational signal, means controlled by a response signal indicating the completion of a subroutine for rendering said circuits responsive to said operational signal, means responsive to said circuits when rendered responsive to said operational instruction for activating said master program record reading station, and means also controlled by said response signal for disabling said subroutine program record reproducer and said second program reader.

12. In a system adapted to perform iterative routines under control of a program record and produce a response signal when the number of iterations required to complete a given routine have been performed: a master program tape having recorded therein an iterative subroutine and an operational signal following said subroutine, a master program tape reading station adapted to read said master program record, a subroutine program tape reproducer connected to said master program tape reading station, a blank subroutine tape in said subroutine program tape reproducer, means for energizing said subroutine program tape reproducer and condition said connections between said master program tape reader and said subroutine program tape reproducer whereby a subroutine record being read from said master program tape is reproduced in said blank tape at said subroutine program tape reproducer, a second program tape reader adapted to read subroutine programs reproduced in said subroutine program tape reproducer, connections between said subroutine program tape reproducer and said second program tape reader adapted to reproduce in said blank tape in said subroutine tape reproducer a subroutine program record being read in said second program tape reader, means for cyclically operating said subroutine tape reproducer and said subroutine program tape reader whereby said subroutine program tape reproduction and reading is cyclically repeated, circuits connected to said second program tape reader normally unresponsive to said operational signal, means controlled by a response signal indicating the completion of a subroutine for rendering said circuits responsive to said operational signal, means responsive to said circuits when rendered responsive to said operational instruction for activating said master program record tape reading station, and means also controlled by said response signal for disabling said subroutine program tape reproducer and said second program tape reader.

13. In a system adapted to perform iterative routines under control of a program record and produce a response signal when the number of iterations required to complete a given routine have been performed: a master program tape having recorded therein an iterative subroutine and an operational signal following said subroutine, a master program tape reading station adapted to read said master program tape, a subroutine program tape punch connected to said master program tape reading station, a blank subroutine tape in said subroutine program tape punch, means for energizing said subroutine program tape punch and conditioning said connections between said master program tape reader and said subroutine program tape punch whereby a subroutine record being read from said master program tape is reproduced in said blank tape at said subroutine program tape punch, a second program tape reader adapted to read subroutine program records reproduced in said subroutine program tape punch, connections between said subroutine program tape punch and said second program tape reader adapted to reproduce in said blank tape in said subroutine tape punch a subroutine program record being read in said second program tape reader, means for cyclically operating said subroutine tape punch and said subroutine program tape reader whereby said subroutine program tape reproduction and reading is cyclically repeated, circuits connected to said second program tape reader normally unresponsive to said operational signal, means controlled by a response signal indicating the completion of a subroutine for rendering said circuits responsive to said operational signal, means responsive to said circuits when rendered responsive to said operational instruction for activating said master program record tape reading station, and means also controlled by said response signal for disabling said subroutine program tape punch and said second program tape reader.

14. In a system adapted to perform iterative routines under control of a program tape and produce a response signal when the number of iterations required to complete a given routine have been performed: a first tape reading station adapted to read a tape having recorded therein an iterative subroutine, a record tape reproducer connected to said first tape reading station, tape controlled means adapted to energize said tape reproducer whereby a subroutine record being read in said first tape reading station is reproduced by said tape reproducer, a second tape reader adapted to read subroutine records reproduced in said tape reproducer, connections between said tape reproducer and said second tape reader adapted to reproduce in said tape reproducer a subroutine tape being read in said second tape reader, and means controlled by a response signal indicating the completion of an iterative routine for disabling said tape reproducer and said second tape reader.

15. In a system adapted to perform iterative routines under control of a punched program tape and produce a response signal when the number of iterations required to complete a given routine have been performed: a first record reading station adapted to read a punched tape having recorded therein an iterative subroutine, a record reproducing punch connected to said first tape reading station, tape controlled means adapted to energize said tape reproducing punch whereby a subroutine record being read in a tape in said first reading station is reproduced by said tape reproducing punch, a second punched tape reader adapted to read subroutine records reproduced in said tape reproducing punch, connections between said tape reproducing punch and said second tape reader adapted to reproduce in said tape reproducing punch a subroutine record being read in said second tape reader, and means controlled by a response signal indicating the completion of an iterative routine for disabling said tape reproducing punch and said second tape reader.

References Cited in the file of this patent

UNITED STATES PATENTS

| | | |
|---|---|---|
| 2,616,626 | Lake | Nov. 4, 1952 |
| 2,636,672 | Hamilton | Apr. 28, 1953 |
| 2,797,862 | Andrews | July 2, 1957 |
| 2,808,986 | Stone | Oct. 8, 1957 |